June 26, 1928.
A. WILLIAMSON
1,675,075
AUTOMOBILE TURN SIGNAL
Filed Nov. 29, 1926
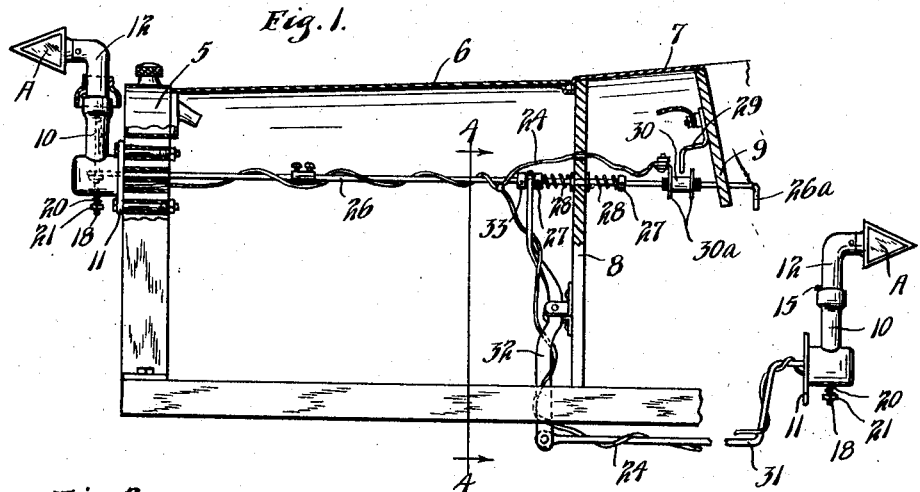
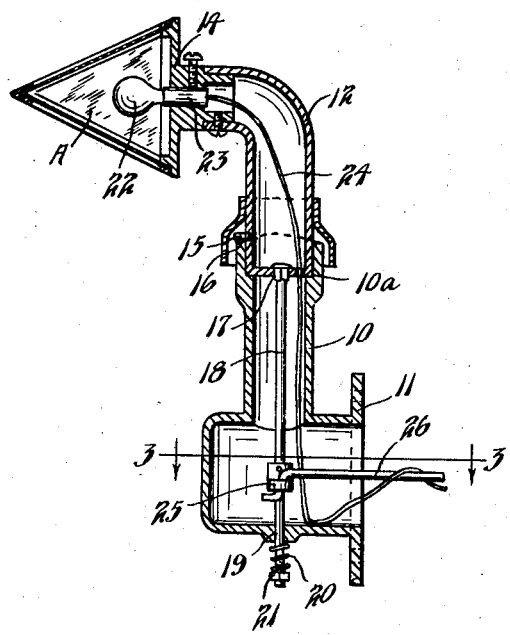
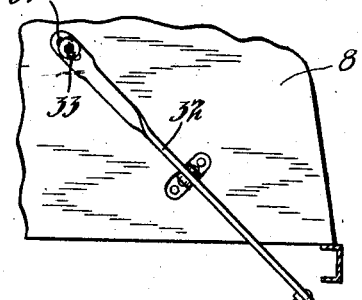
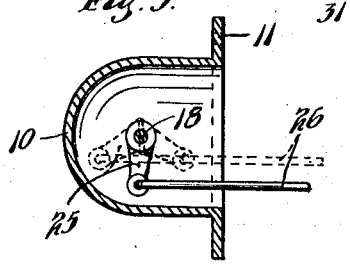
INVENTOR.
ADOLPH WILLIAMSON.
BY HIS ATTORNEYS Patented June 26, 1928.

1,675,075

UNITED STATES PATENT OFFICE.

ADOLPH WILLIAMSON, OF MINNEAPOLIS, MINNESOTA.

AUTOMOBILE TURN SIGNAL.

Application filed November 29, 1926. Serial No. 151,345.

This invention relates to automobile signals and especially to signals adapted to be mounted on motor vehicles to indicate the turning or direction of travel thereof.

The main object of the invention is to provide an extremely simple but highly efficient turn signal for automobiles which may be clearly visible from both sides of the car, to drivers and to pedestrians, and which will from a single indicator designate both right and left turns.

A further object is to provide in an automobile turn signal, apparatus including an outwardly extending oscillatory signal mechanism adapted to be mounted on an automobile in position to be seen from both sides of the car and capable of being turned to right or left direction to signal turns in said directions.

Another object is to provide a signal apparatus including a pair of oscillatory indicating arms, one disposed adjacent each end of the automobile, each being capable of oscillation in right or left directions and both being interconnected with simple operating mechanism for simultaneously manipulating both, to indicate right or left turns.

These and other objects of the invention will be apparent from the following description made in connection with the accompanying drawings wherein like characters refer to similar parts throughout the several views, and in which:

Fig. 1 is a diagrammatical view showing a preferred embodiment of my apparatus mounted on an automobile;

Fig. 2 is a vertical section through one of the signalling devices.

Fig. 3 is a cross section taken on the line 3—3 of Fig. 2, showing the means for operating the indicator; and Fig. 4 is a cross section taken on the line 4—4 of Fig. 1, showing the connection between the operating means and the rear signal device.

Referring to the drawings in detail, 5 indicates the radiator of a standard type of automobile, 6 the hood, 7 the cowl, 8 the vertical partition between the engine and the body, and 9 the dash or instrument board.

My invention generally stated may comprise one or two signal mechanisms located at the front and rear of the car respectively, each in position to be seen from both sides of the car, and simple and efficient means for operating both signals where two are employed, and for simultaneously causing said signals to be illuminated. It is, of course, understood that either of the signal mechanisms, which are identical in structure, may be employed separately within the scope of this invention.

The two signalling mechanisms each comprise preferably a tubular shaped member or pedestal 10, having an annular seat $10^a$ within the upper end thereof, and rigidly carrying a vertical flange or attaching base 11 at its lower end apertured to receive bolts or other securing means. Pedestals 10 have swivelly mounted thereon the goose neck indicating arms 12, which have their lower ends rotatably seated in seats $10^a$. The upper horizontally extending portions of indicating arms 12 carry arrow shaped indicators A, which may be constructed of translucent material, such as celluloid or glass secured to a suitable flanged sleeve 14, sleeve 14 being secured to the upper extremity of arm 12. A horizontally extending pin 15 is carried by the lower portion of indicating arm 12 extending radially from the vertical portion thereof in position to contact the upper edge of pedestal 10 and is adapted to be seated in a suitable notch or recess 16 formed in said edge to normally hold the indicator A in forwardly extending non-signalling position. A web or base 17 is preferably formed in the lower end of arm 12 having a depending carriage bolt 18 keyed thereto, bolt 18 having its lower end extending through a suitable bearing 19 in the under side of pedestal 10. A spring 20 may be interposed between the under side of pedestal 10 and a nut or pin 21 secured to the lower extremity of bolt 18, resiliently holding the lower portion of arm 12 against its seat $10^a$.

Indicators A are preferably provided with illuminating means, such as the electric light bulbs 22, secured in suitable sockets 23 electrically connected to a source of electricity through cable 24, which passes through the interior of arm 12 and pedestal 10.

The carriage bolt or shaft 18 has rigidly secured thereto a rocker arm 25, which is suitably connected to an operating handle for oscillating indicating arm 12 and the indicator A in either right or left directions.

As shown in Fig. 1, the front signalling device is mounted on the front side of the radiator 5, the fastening bolts passing through the apertures in attaching flange 11 and through the apertures in said radiator and is operated preferably by means of an elongated horizontal rod or wire 26 having its forward end connected with rocker arm 25 and extending through radiator 5, partition 8 and the dash 9, and terminating at its rear end in an operating handle 26ª. Operating rod 26 carries a pair of adjustable stops 27 disposed on opposite sides of partition 8 in spaced relation thereto. Balance springs 28 are coiled about rod 26 interposed between the stops 27 and the front and rear sides of partition 8 respectively, adapted to resiliently return indicator A to forwardly pointing, non-signalling position when moved therefrom.

A fixed electrical contact 29 is preferably secured to the forward side of dash 9 suitably connected to a source of electricity and having a depending end in position to contact either of a pair of spaced flanges 30ª on movable contact 30, which is rigidly secured adjacent the rear end of operating rod 26. Movable contact 30 is connected with cable 24 of the forward signal.

The rear signal may be mounted on any suitable supporting member at the rear of the car and has its rocker arm 25 connected by a link or arm 31 with the lower end of a relatively large lever 32, which may be pivoted intermediately on the forward side of partition 8. Link 31 is shown bent outwardly and then inwardly, having a relatively long horizontal portion, the forward end of which connects with lever 32. It will be noticed that lever 32 swings in a plane diagonally disposed with reference to the floor of the car, enabling its upper end to be connected to operating rod 26. This connection may be as shown in Fig. 4, wherein the upper end of lever 32 is twisted and slotted at 32ª, operating rod 26 passing through said slot and held against lateral displacement therefrom by means of a stop 33 engaging said lever on the forward side thereof. The electric conductor or cable 24ª connected with the rear signal is connected with the cable 24 of the forward signal, whereby both indicators A will be simultaneously illuminated.

*Operation.*

The operation of my device will perhaps be obvious from the foregoing description, but may be briefly summarized as follows:

Assuming the parts to be in normal position, as illustrated in Fig. 1, it is only necessary for the automobile driver to pull or depress operating handle 26ª to cause indicators A to be immediately oscillated to left or right signalling positions respectively, and to simultaneously illuminate said indicators. Operating handle 26ª will be held in its desired moved position as long as the driver wishes to signal the turn and immediately upon being released indicators A will be returned to normal longitudinally extending positions and the circuits through lamps 22 will be opened. The balance springs 28 perform this function and permit the pin 15 to be seated in notch 16 thereby preventing vibration or accidental oscillation of the indicators when the car is in motion. The dotted lines in Fig. 3 indicate right and left positions of the arrows A, the movements thereof, of course, being effected by the longitudinal movement of operating rod 26. Rod 26 also is operative to reciprocate lever 32, thereby oscillating arm 25 in the rear signal simultaneously with the operation of the forward signal.

It will be noted that the forward signal is mounted on radiator 5 in such position that the indicator A extends above the top line of radiator 5 and hood 6 rendering itself observable from the sides of the automobile. It will, of course, be understood that either the front or rear signal may be employed without the opposite signal connected thereto, and that moreover the illuminating means for indicators A may be dispensed with if desired, although the co-operation of the turning indicator and the means for illuminating the same when turned co-operate to provide a highly efficient signal which will readily attract the attention of other drivers and pedestrians.

From the foregoing description it will be seen that I have provided a simple but efficient turn signal for automobiles capable of attachment to any standard type of automobile, and operative to signal with one indicator both right and left turns, said indicator being observable from both sides of the car.

It will, of course, be understood that various changes may be made in the form, details, arrangement and proportions of parts without departing from the scope of the invention.

What is claimed is:

1. Signal apparatus of the class described comprising a hollow base member adapted to be secured to a motor vehicle and having an upstanding sleeve, a substantially horizontally extending indicator having a depending sleeve telescoped with said first mentioned sleeve and capable of oscillation thereon, a rocker arm secured to said last mentioned sleeve, a substantially horizontal rod connected to said rocker arm and extending into the body of said vehicle, and means for limiting the forward and rearward movement of said arm, whereby said indicator will be turned to either right or left signalling positions when said rod is moved to said extreme positions a substantially stationary member through which said rod passes, and elastic balancing elements connected with said rod at each side of said stationary element and engaging said stationary element to return said indicator to normal position when moved therefrom.

2. A signal apparatus of the class described, comprising an auxiliary indicator mounted on a substantially vertical axis, a rock shaft rigidly connected with said indicator, a longitudinally movable operating rod connected with said rock shaft having a handle portion disposed for manipulation within the body of a motor vehicle, an upstanding member through which said rod passes, stops on said rod at each side of said upstanding member and coiled balance springs surrounding said rod, one disposed at each side of said upstanding member between the same and said stops to return said indicator to normal position when moved therefrom in either direction.

3. Signal apparatus of the class described, comprising a tubular bracket having an upstanding substantially vertical portion an indicator having a stem telescoped with the upstanding portion of said bracket and seated therein, the upper edge of said bracket having a recessed portion and said stem carrying a laterally projecting stud adapted to be releasably retained by said recessed portion to hold said indicator in normal position, and means controllable from the interior of a motor vehicle for swinging said indicator to either left or right indicating positions.

In testimony whereof I affix my signature.

ADOLPH WILLIAMSON.